United States Patent

Kiener

(10) Patent No.: US 12,162,068 B2
(45) Date of Patent: Dec. 10, 2024

(54) REMOVING FILLING MATERIAL FROM A CAVITY IN A COMPONENT AND APPARATUS FOR PERFORMING SAME

(71) Applicant: Siemens Aktiengesellschaft, Munich (DE)

(72) Inventor: Christoph Kiener, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/329,995

(22) PCT Filed: Aug. 30, 2017

(86) PCT No.: PCT/EP2017/071776
§ 371 (c)(1),
(2) Date: Mar. 1, 2019

(87) PCT Pub. No.: WO2018/046373
PCT Pub. Date: Mar. 15, 2018

(65) Prior Publication Data
US 2019/0193148 A1    Jun. 27, 2019

(30) Foreign Application Priority Data

Sep. 6, 2016  (DE) ..................... 10 2016 216 839.8

(51) Int. Cl.
*B29C 64/35*   (2017.01)
*B08B 5/04*    (2006.01)
(Continued)

(52) U.S. Cl.
CPC .............. *B22D 29/005* (2013.01); *B08B 5/04* (2013.01); *B08B 7/02* (2013.01); *B08B 7/026* (2013.01);
(Continued)

(58) Field of Classification Search
CPC ......... B22D 29/005; B08B 7/02; B08B 7/026; B08B 5/04; B08B 9/00; B22F 3/1055;
(Continued)

(56) References Cited

U.S. PATENT DOCUMENTS 6,953,503 B2   10/2005  Miyazawa et al. ........ 106/287.1
8,646,662 B2    2/2014  Habibi-naini et al. ....... 222/459
(Continued)

FOREIGN PATENT DOCUMENTS

CN    1463217 A    12/2003
CN    2654194 Y    11/2004
(Continued)

OTHER PUBLICATIONS

German Office Action, Application No. 10 2016 216 839.8, 8 pages, Jul. 26, 2017.
(Continued)

*Primary Examiner* — Erin F Bergner
(74) *Attorney, Agent, or Firm* — Slayden Grubert Beard PLLC

(57) ABSTRACT

Various embodiments may include a method for removing filling material from a cavity in a manufactured component with a connection from the cavity opening to surroundings of the component, the method comprising: holding the component in a movable mounting; moving the component and at the same time removing the filling material through the connection opening; and executing a computer program with a processor, wherein the computer program instructs the processor to: analyze geometry data of the component including the connection opening; and calculate a necessary positioning of the component, based on the geometry data and gravitational force; and direct the movable mounting through a sequence of movements for moving the compo- (Continued)

nent in space to spill the filling material from the cavity through the connection opening out of the component.

10 Claims, 2 Drawing Sheets

(51) Int. Cl.
| | |
|---|---|
| *B08B 7/02* | (2006.01) |
| *B08B 9/00* | (2006.01) |
| *B22D 29/00* | (2006.01) |
| *B29C 64/153* | (2017.01) |
| *B33Y 40/00* | (2020.01) |
| *B33Y 40/20* | (2020.01) |
| *B22F 10/28* | (2021.01) |
| *B22F 10/68* | (2021.01) |
| *B22F 10/73* | (2021.01) |
| *B22F 10/80* | (2021.01) |
| *B22F 12/88* | (2021.01) |

(52) U.S. Cl.
CPC .............. *B08B 9/00* (2013.01); *B29C 64/153* (2017.08); *B29C 64/35* (2017.08); *B33Y 40/00* (2014.12); *B33Y 40/20* (2020.01); *B22F 10/28* (2021.01); *B22F 10/68* (2021.01); *B22F 10/73* (2021.01); *B22F 10/80* (2021.01); *B22F 12/88* (2021.01); *B22F 2999/00* (2013.01)

(58) Field of Classification Search
CPC ...................... B22F 2999/00; B22F 2003/105; B22F 10/20; B22F 10/70; B33Y 40/00; B29C 64/153; B29C 64/35; Y02P 10/25
See application file for complete search history.

(56) References Cited

U.S. PATENT DOCUMENTS

| | | | |
|---|---|---|---|
| 9,492,235 B2 | 11/2016 | Hourtash et al. | |
| 2009/0283119 A1* | 11/2009 | Moussa | B29C 71/04 134/57 R |
| 2010/0291401 A1 | 11/2010 | Medina et al. | 428/593 |
| 2013/0026680 A1 | 1/2013 | Ederer et al. | 264/401 |
| 2015/0034604 A1* | 2/2015 | Subramanian | B22F 7/06 219/73.21 |
| 2016/0074940 A1 | 3/2016 | Cote et al. | 134/23 |
| 2016/0279871 A1* | 9/2016 | Heugel | B29C 64/153 |

FOREIGN PATENT DOCUMENTS

| | | | | |
|---|---|---|---|---|
| CN | 102387871 A | 3/2012 | | |
| CN | 103955207 A | 7/2014 | | |
| CN | 104334110 A | 2/2015 | | |
| DE | 30 10 964 A1 | 11/1980 | | |
| DE | 10 2010 015 451 A1 | 10/2011 | | |
| DE | 10 2012 024 266 A1 | 6/2014 | | |
| DE | 102013223407 A1 * | 5/2015 | ........... B22F 3/1055 | |
| JP | 2003-225948 A | 8/2003 | | |
| WO | 2015/106193 A1 | 7/2015 | | |
| WO | 2018/046373 A1 | 3/2018 | | |

OTHER PUBLICATIONS

International Search Report and Written Opinion, Application No. PCT/EP2017/071776, 27 pages, Nov. 29, 2017.
Chinese Office Action, Application No. 201780054350.8, 8 pages, Jul. 31, 2020.

* cited by examiner

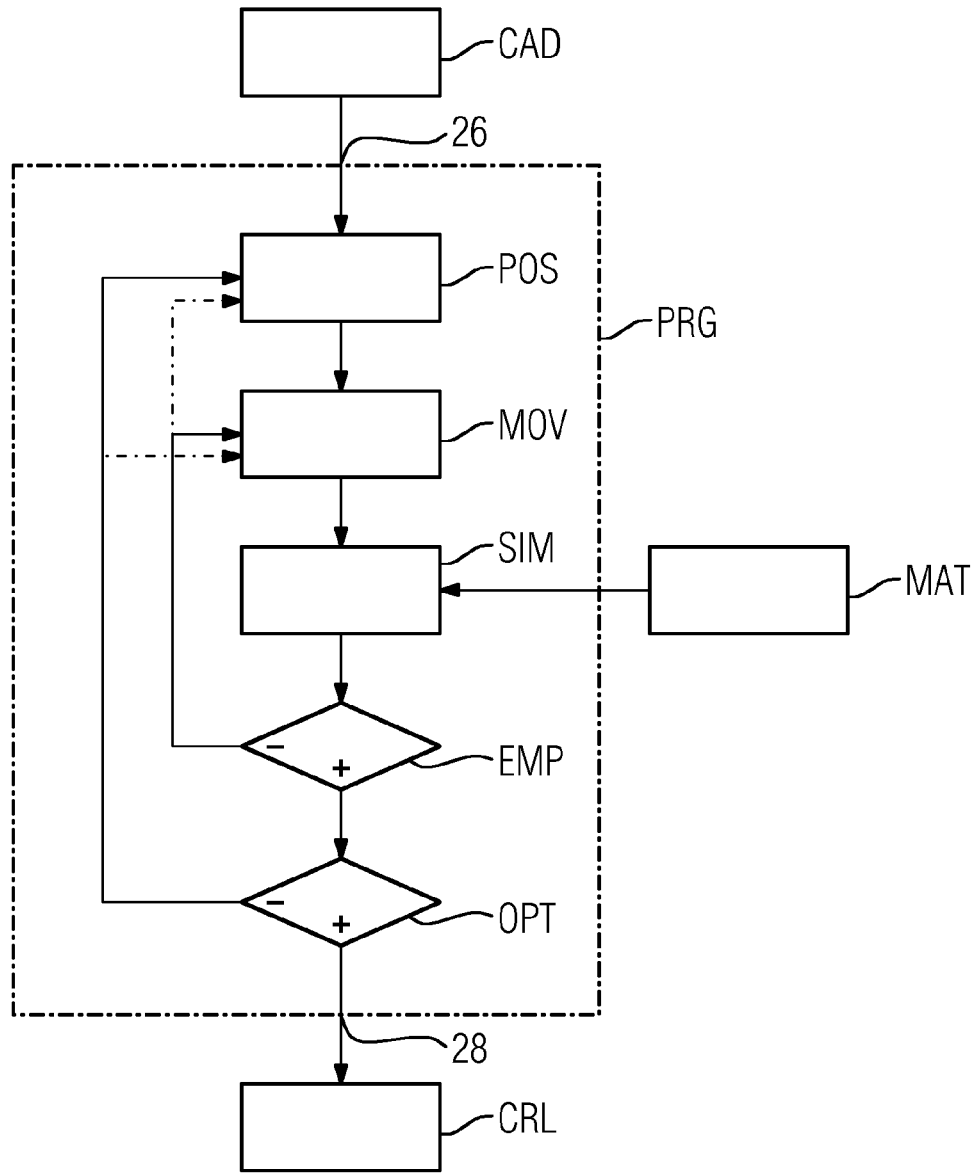

REMOVING FILLING MATERIAL FROM A CAVITY IN A COMPONENT AND APPARATUS FOR PERFORMING SAME

CROSS-REFERENCE TO RELATED APPLICATIONS

This application is a U.S. National Stage Application of International Application No. PCT/EP2017/071776 filed Aug. 30, 2017, which designates the United States of America, and claims priority to DE Application No. 10 2016 216 839.8 filed Sep. 6, 2016, the contents of which are hereby incorporated by reference in their entirety.

TECHNICAL FIELD

The present disclosure relates to manufacturing methods and apparatus. Various embodiments may include methods for removing filling material from a cavity present in a component and/or apparatus to do the same.

BACKGROUND

US 2016/0074940 A1 describes the problem that components that have been manufactured by means of an additive process, such as for example laser melting, in a powder bed must be subsequently freed of the particles of the powder bed that have not fused. This causes particular problems in cavities which have been produced in the component. In order to be able to remove the powder from these cavities, the component has connection openings between the cavity and the surroundings of the component, through which the powder can be removed. For this purpose, the component may be moved, for example turned or pivoted, in order to transport the powder in the cavity progressively to the connection opening. In the case of complicated geometries of the cavities or in the case of large cavities, this method is time-consuming and there is also the risk that the powder may not be removed completely from the cavity.

There is a similar problem in the additive manufacturing of components in liquids, as is the case for example with stereolithography. The component is produced by local solidification of a liquid material (for example a resin compound), the liquid raw material remaining in cavities that are produced. Like the powder, this can similarly be considered to be a filling material in the cavities. It can flow out through connection openings in the component, the component likewise having to be pivoted or turned, depending on the geometry of the cavity.

Lastly, such methods must also be used when cavities of cast or injection-molded components have to be freed of the core material that has been placed into the casting mold to form cavities. To this extent, the core material also represents a filling material that may occur in the cavity of a component. Depending on the nature of the material, it can be melted out, dissolved, and/or mechanically destroyed, the filling material in this way becoming flowable and being able to flow out of the component through the connection opening.

Apart from liquid-based production methods, powder-based production methods may be mentioned as additive manufacturing methods, because components that are produced in the powder bed with a cavity are automatically filled with the material of the powder bed as a filling material. Specifically, methods in which the material from which a component is to be produced is added to the component during its creation can be used. In this case, the component is already created in its final form, or at least approximately in this form. The building material may for example be powdered or liquid, the material for producing the component being chemically or physically solidified by the additive manufacturing process.

To produce the component, data describing the component (CAD model) are prepared for the chosen additive manufacturing process. To generate instructions for the production installation, the data are converted into data of the component that are adapted to the production process, in order that the suitable process steps for successively producing the component can proceed in the production installation. For this, the data are prepared in such a way that the geometrical data for the layers (slices) of the component to be produced in each case are available, which is also referred to as slicing. Examples of additive manufacturing include selective laser sintering (also SLS), selective laser melting (SLM), and electron beam melting (EBM). These processes are suitable in particular for processing metallic materials in the form of powders with which construction components can be produced. In SLM, SLS, and EBM, the components are produced layer by layer in a powder bed. These processes are then also referred to as powder-bed additive manufacturing processes. In each case, a layer of the powder is produced in the powder bed and is subsequently locally melted or sintered by the energy source (laser or electron beam) in those regions in which the component is to be created. Thus, the component is successively produced layer by layer and after completion can be removed from the powder bed.

SUMMARY

Additive manufacturing may, then, require removing filling material from cavities of components as completely as possible and in the shortest possible time. The teachings herein may be embodied in methods for removing filling material from a component with which the removal of filling material can be performed as completely as possible and in the shortest possible time as well as means for implementing this method.

For example, some methods for removing filling material (32) from a cavity present in a component (13), the cavity having a connection opening (24) to the surroundings of the component (13), may have the following method steps: holding the component (13) in a movable mounting (16), moving the component (13) while at the same time removing the filling material (32) through the connection opening (24), characterized in that a processor (P) processes the geometry data of the component (13), a computer program that runs on the processor (P) taking into account the geometry of the cavity and of the connection opening (24) in the component (13), while taking gravitational force into account, calculating a necessary positioning of the component (13) and a subsequent necessary sequence of movements for moving the component (13) in space in order that the filling material (32) is removed through the cavity to the connection opening (24) and through the connection opening (24) out of the component (13).

In some embodiments, the removal of the filling material (32) is simulated by the computer program, the flow properties of the filling material (32) being taken into account in the simulation, simulations with different positionings and/or different sequences of movements are carried out repeatedly, the positioning and the sequence of movements with which most filling material (32) or all of the filling material (32) is removed from the component (13) in the shortest time is chosen.

In some embodiments, before and/or after moving the component (13), a suction removal of filling material through the connection opening (24) is performed.

In some embodiments, the mounting (16) is located on a robot (15) and the sequence of movements is performed by the robot (15).

In some embodiments, the robot (15) allows movements about at least three axes.

In some embodiments, the component (13) is made to undergo mechanical vibrations by a vibration generator (30).

In some embodiments, the vibrations are in the ultrasonic range.

In some embodiments, the filling material (32) consists of a powder and the flow behavior of the powder is calculated by the computer program from the parameters particle size and/or particle shape and/or particle material and/or particle density.

As another example, some embodiments may include a computer program characterized in that with this program the geometry of a cavity in a component (13) and of a connection opening (24) between the cavity and the surroundings of the component (13), the cavity being filled with a filling material (32), are transferable as input variables by way of an input interface (26), while taking gravitational force into account, a necessary positioning of the component (13) and a subsequent necessary sequence of movements of the component (13) in space in order that the filling material (32) is removed through the cavity to the connection opening (24) and through the connection opening (24) out of the component (13) can be calculated, the positioning and the sequence of movements of the component can then be output as output variables by way of an output interface (28).

In some embodiments, it allows a method as described above to be carried out.

As another example, some embodiments may include a production unit, characterized in that it has: a movable mounting (16) for holding a component (13), a processor (P), on which a computer program as claimed in claim 9 is installed, an actuator, in particular a robot (15), for movement of the movable mounting, and a controller for moving the actuator, the positioning and the sequence of movements being transferable as input variables via an interface (29).

In some embodiments, there is an installation (12) for additively manufacturing the component (13) and a material interface (14) for receiving the component (13) by the mounting (16).

BRIEF DESCRIPTION OF THE DRAWINGS

Further details of the teachings herein are described below on the basis of the drawings. Elements of the drawings that are the same or corresponding are respectively provided with the same reference signs and are only explained more than once if there are differences between the individual figures, in which:

FIG. 3 shows an exemplary embodiment of the computer program incorporating teachings of the present disclosure as a flow diagram.

DETAILED DESCRIPTION

Figure 1:
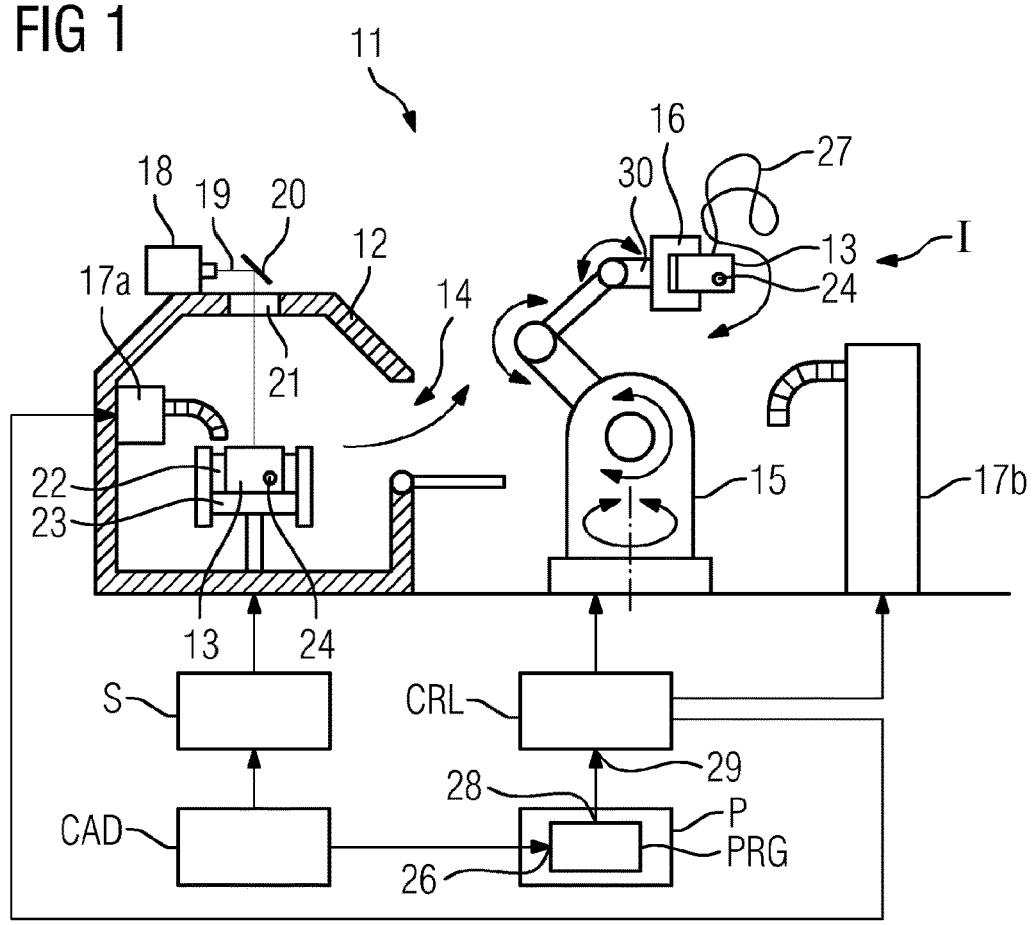
FIG. 1 shows an exemplary embodiment of a production installation incorporating teachings of the present disclosure, on the basis of which an exemplary embodiment of the method can be operated, as a schematic side view, partially in section.

In some embodiments, as a processor processes the geometry data of the component in question, a computer program that runs on the processor taking into account the geometry of the cavity and of the connection opening in the component. Subsequently, while taking gravitational force into account, the computer program calculates a necessary positioning of the component and a subsequent necessary sequence of movements for moving the component in space in order that the filling material is removed through the cavity to the connection opening and through the connection opening out of the component. With the aid of this calculated sequence of movements, the component is subsequently moved while simultaneously removing the filling material through the connection opening, a removal of filling material that is as complete as possible, and/or taking place with a time requirement that is as short as possible. The component may be separated from the building platform on which it was produced before being moved or be moved together with the building platform.

In some embodiments, the computer program may take over the geometry data of the produced component for example from a CAD dataset that has already been generated in the course of creating the structural design of the component and preparing for generating the data for the additive manufacturing. The dataset for producing the additive component is also suitable in principle for being used for a calculation of the positioning or position (these terms are used synonymously) of the component and of the subsequent sequence of movements. The positioning of the component is understood as meaning the position that the component assumes before the calculated sequence of movements starts. The sequence of movements inevitably causes the component to leave the positioning, possibly going in the sequence of movements to further intermediate positions or intermediate positionings (the two terms are used synonymously) in which the component stays for a defined period of time in order to give the filler time to flow. These intermediate positionings are however to be understood as part of the sequence of movements.

In some embodiments, in the case of small series, the extra effort that arises due to the calculation of the sequence of movements and the positioning of the component by the computer program is balanced by the time that is saved in the subsequent removal of the filling material from the cavity. Even in the case of one-off productions, the effort required for the calculation is worthwhile, because checking whether a cavity has been completely freed of filling material is very time-consuming and it may be that a number of iterations of the removal process are required in order to achieve complete removal. Prior calculation of the positioning and the sequence of movements by means of the computer program allows this to be avoided.

In some embodiments, the removal of the filling material is simulated by the computer program, the flow properties of the filling material being taken into account in the simulation. In this case, simulations with different positionings and/or different sequences of movements are carried out repeatedly, that positioning and that sequence of movements with which most filling material or all of the filling material is removed from the components in the shortest time being chosen at the end. The aim of the optimization depends on the circumstances of the individual case. If the geometry of the cavity is of such a kind that not all of the filling material can be removed from the component, the aim of the optimization is primarily to remove as large a proportion as possible. If in principle all of the filling material can be removed from the cavity, the aim of the optimization is primarily to carry out this process in as short a time as possible, so that the sequence of movements is optimized with regard to its efficiency.

In some embodiments, before and/or after moving the component, a suction removal of filling material through the connection opening is performed. For this, a suitable suction removal device with a suction tube is provided. Suction removal before moving the component may already lead to a removal of filling material, at least in the region near the connection opening. At the same time, if it is a powder, the filling material is loosened, whereby the removal achieved by moving is subsequently made easier. If the removal achieved by moving has taken place almost completely, so that only small residual amounts of powder remain in the cavity, a subsequent suction removal can be advantageously used to also remove these residual amounts. In particular if the cavity has two connection openings, this method is particularly effective, since the air sucked out with the particles through one connection opening can be replaced by air flowing in through the other connection opening.

In some embodiments, the mounting is located on a robot and the sequence of movements is performed by the robot. The robot has for this purpose a robot arm, this advantageously allowing movements about at least three axes. The more axes the robot arm provides, the more complex the movements that are calculated by means of the computer program and can also be implemented by the robot can be. The robot may be capable of implementing the movements exactly and replicating the thus-calculated result with minimal errors. In the calculation of the sequence of movements, the computer program must take into account the degrees of freedom of the movement system, for example of the robot, in order that the movement system can implement the calculated sequence of movements.

In some embodiments, the component is made to undergo mechanical vibrations by a vibration generator. In particular, these vibrations may be in the ultrasonic range. For this purpose, a suitable vibration actuator is used, for example fastened to the mounting for the component. The vibrations may then be transferred to the component and improve the flowability of the filling material. In this way, both the amount of filling material that is removed can be increased and the removal time required for this can be reduced.

In some embodiments, if the filling material consists of a powder, the flow behavior of the powder is calculated by the computer program from the parameters particle size and/or particle shape and/or particle material and/or particle density. These are parameters which are directly associated with the production of the component and can be partly supplemented by specifications of the powder manufacturers. The particle size and the particle shape are relevant to the flow behavior of the powder to the extent that larger particles do not flow as well as smaller particles and more round particles flow better than more angular particles. The particle material may be of significance because the powder particles adhere to one another more or less well depending on the particle material. The particle density that is created in the production of the powder bed is of significance because the flowability of the powder decreases with a higher particle density. Therefore, the already mentioned introduction of vibrations is possibly required in order to initiate the flow behavior of the powder in the first place.

The flow behavior is also of significance in the case of liquid filling materials but can be derived directly from the parameters applicable to the liquid (viscosity, surface tension, wetting behavior on the walls of the cavity). A possible capillary effect of the liquid also depends on the geometry of the cavity.

In some embodiments, the powder recovered or the liquid recovered can be fed back to the additive manufacturing process for producing a further component. It is not contaminated, so that the component quality of the component subsequently produced does not suffer as a result of the feedback. Furthermore, a feedback of the building material also means that it does not enter the environment, and therefore the detrimental effect on the health of employees in a corresponding production plant is low.

In some embodiments, even larger components that are too heavy to be moved manually can be taken out of the production installation and moved for removing the powder from the cavity by means of a robot. All that is required for this is that the capacity or the power of the robot must be adapted in a suitable way.

In some embodiments, a computer program allows the geometry of the cavity in a component and of a connection opening between the cavity and the surroundings of the component to be transferable as input variables by way of an input interface. In this case, the cavity is filled with a supporting material, so that, while taking gravitational force into account, a necessary positioning of the component and a subsequent necessary sequence of movements of the component in space in order that the supporting material is removed through the cavity to the connection opening and through the connection opening out of the component can be calculated. The positioning and the sequence of movements of the component are then output as output variables by way of an output interface.

In some embodiments, the computer program may be used in a method already described above for removing the material from a component. As already mentioned, the geometry that is input into the computer program by way of the input interface may be taken from datasets of a CAD system. The output interface of the computer program is then for example connected to a controller for a robot, which first fixes the component to be emptied in a calculated position and subsequently carries out a movement in accordance with the calculated sequence of movements. In this case, the component runs through a specific spatial curve (trajectory), which may be made up of pivoting movements and tumbling movements. It is also possible that the component stays for a certain period of time in specific intermediate positionings in order to give the filling material time to run through a specific portion of the cavity in the direction of the connection opening.

In some embodiments, a production unit has the following components: a movable mounting for holding the component, a processor, in which a computer program of the type described is installed, an actuator, in particular a robot, for moving the movable mounting and a controller for moving the actuator, the positioning and the sequence of movements being transferable as input variables by way of an interface. Consequently, the production unit is prepared for taking over the data of the computer program incorporating teachings of the present disclosure and thereby carrying out the method described above. The advantages already explained above are therefore likewise achieved by the production unit.

In some embodiments, this installation additionally has an installation for the additive manufacturing of the component and a material interface for the component to be received by the mounting. The material interface may be for example a shutter or a flap, which can be opened in order to remove the mounting and the component from the building platform present in the installation or take them over together with the building platform. The removal of the filling material can then be performed directly in the production system and be fed back to the installation for additive manufacturing.

As shown in FIG. 1, production unit 11 has an installation 12 for additively manufacturing a component 13, this being an installation for selective laser melting. This installation has a material interface 14 in the form of a flap, through which the component can be received in a mounting 16 by a robot 15 with four axes indicated by double-headed arrows. Furthermore, the production unit 11 has a number of suction removal devices 17a, 17b.

The setup of the installation 12 for selective laser melting is only schematically represented in FIG. 1. A laser 18 generates a laser beam 19, which is directed by way of a deflecting optical unit 20 through a process window 21 onto a powder bed 22, so that the component 13 is created layer by layer on a building platform 23. After production of the component 13 has taken place, it can first be freed from the powder bed by means of the suction removal device 17a. Furthermore, some powder can already be removed from a cavity 25 (represented in FIG. 2) of the component by way of a connection opening 24.

Subsequently, in the exemplary embodiment according to FIG. 1, the component 13 is released from the building platform 23 and subsequently taken out of the installation 12 by the robot 15 with the mounting 16. In some embodiments, the component 13 may also be removed from the installation 12 together with the building platform 23, and the separation of the component 13 from the building platform 23 may only be performed after emptying of the cavity 25 has taken place.

For the production of the component 13, the CAD data of a computer CAD are transferred to a controller S, this controller transforming the CAD dataset into a form that is processable for the installation 12 (known as slicing). In this case, the data are prepared in such a way that there is a description of the geometry of the component 13 in the form of the layers to be produced in the powder bed. This process is known per se and is not to be explained in any more detail at this point.

In some embodiments, the CAD data are however also used to be processed in the program PRG according to the invention by way of an input interface 26. This is implemented in a processor P and serves the purpose of determining from the geometrical data a meaningful sequence of movements 27 and a position I, from which the sequence of movements 27 starts. This sequence of movements is transferred by way of an output interface 28 to an interface 29 of a controller CRL, which in turn activates the robot 15. The controller CRL activates the robot 15 in such a way that it can both select the position I and, from this positioning I, describe the spatial curve of the sequence of movements 27. After running through the sequence of movements 27, the suction removal device 17b is used in order to suck away any residual amounts of powder that may possibly still be present out of the cavity 25. The suction removal device 17b may likewise be controlled by the controller CRL.

In some embodiments, the controller CRL may activate a vibration generator 30, to which the mounting 16 is fastened. As also represented in FIG. 2, the component 13 may be made to undergo vibrations 31 (cf. FIG. 2), preferably in the ultrasonic range, by way of the vibration generator 30 in order to assist the removal of the filling material 31.

Figure 2:
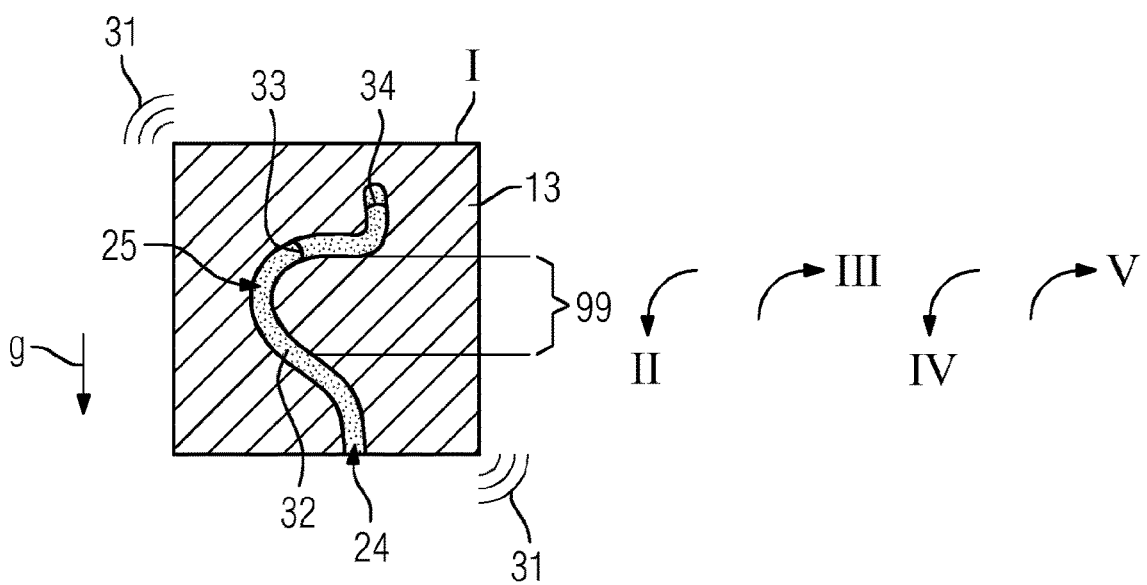
FIG. 2 shows an exemplary embodiment of a method incorporating teachings of the present disclosure in which a number of steps of positioning and moving a component are schematically represented.

The sequence of the method for removing the filling material 32 can be taken from FIG. 2. The component 13 is shown in the calculated positioning I, with which the sequence of movements begins. The cavity 25 is an elongate channel, a procedure of maintaining the positioning I while at the same time introducing the vibrations 31 having the effect that, by assisting gravitational force g, the filling material 32 up to a first portion 33 is removed from the connection opening 24. After that, a quarter turn (indicated in FIG. 2) has the effect that the component is brought into an intermediate positioning II, so that the material up to a portion 34 trickles down into the arcuate portion 99 ahead of it of the cavity 25. However, it remains lying there, so that the component 13 has to be turned back into an intermediate positioning III, which corresponds to the positioning I. Then, the filling material 25 is removed from the arcuate portion 99 through the connection opening 24. At the same time, the filling material can trickle down out of the last pocket-like portion. A repetition of the last two movements into an intermediate positioning IV (corresponding to II) and back into an intermediate positioning V (corresponding to I and III) has the effect that the last residual amount of the filling material 25 is also removed.

This example is given a relatively simple geometry of the cavity, in particular because it can be represented two-dimensionally in the drawing. The computer simulation by means of the computer program, however, allows the optimization of much more complex hollow structures that extend three-dimensionally in space.

A possible sequence of the calculation by means of the computer program PRG is represented in FIG. 3. The CAD data serve as an input at the input interface 26, the positioning POS being determined from the position of a connection opening of the component to be calculated. Starting from this positioning, a sequence of movements MOV is then determined and, with the positioning POS and also the sequence of movements MOV (possibly also selected intermediate positionings in which the movement is stopped), the removal of filling material is simulated in a simulation module SIM. This involves using material data of the filling material MAT, which are fed into the simulation module. Software for the simulation of the flowing processes can be implemented in the computer program because they have already been programmed as such and can for example be purchased. An example of such simulation software is the commercial software product STAR-CCM+® of the manufacturer CD-adapco, in which various fluids without restriction can be calculated (for example air and fluidized powder in the case of powder-bed-based processes; air and liquid monomer in the case of stereolithography).

It is subsequently inquired whether the component has been completely emptied (EMP). If this is not the case, a different sequence of movements MOV (alternatively also a different positioning POS) is generated and fed to a further simulation. As a tendency, if the emptying result is unsatisfactory, the sequences of movements become increasingly longer. Therefore, there is a further inquiry as to whether the result is achieved in a reasonable time. This is decided in the inquiry OPT, in the negative case the method may be simulated once again in a different positioning POS (alternatively with a new sequence of movements MOV). Lastly, the most favorable movement regime, consisting of a positioning $POS_n$ and a subsequent sequence of movements MOV$_n$, is selected. The optimum result may then be passed on to the controller CRL by way of the input interface 28.

The costs that can be saved by complete emptying can be demonstrated by a cost calculation on the basis of a model. An empty component, weighing 3.4 kg, with hollow structures with a capacity for 1.7 kg of powder is produced in a powder bed, which comprises 140 kg of powder. With an assumed price for the powder of about 140 €/kg, this means that there is a loss in terms of cost of about €240. With the production of one component per day, these powder losses are around 70 000 €/year. For series production, the robot can empty about 40 components per day. This assumes movement times of about 20 minutes including setup times. With an average additional powder feedback of only 0.5 kg of powder per component, this means a gain per day of 2800 €/robot, and consequently up to 800 000 €/year, if along with the aforementioned components other components are also emptied in order to fully utilize the robot and also the computer or computers with the processor P.

What is claimed is:

1. A method for removing filling material from a cavity in a manufactured component with a connection from the cavity opening to surroundings of the component, the method comprising:
   executing a computer program with a processor, wherein the computer program instructs the processor to:
   access a computer aided drafting (CAD) dataset used to manufacture the component;
   analyze geometry data from the CAD dataset including a location and an orientation of the connection opening in the manufactured component; and
   calculate a necessary positioning of the manufactured component, based on the analyzed geometry data and gravitational force and a flow behavior of the filling material; and
   generate instructions for an actuator to move a mounting through a sequence of movements for moving the manufactured component in space to spill the filling material from the cavity through the connection opening out of the component based on the calculated necessary positioning;
   holding the component in the mounting; and
   automatically driving the actuator to move the mounting and the component according to the instructions and at the same time allow the filling material to fall through the connection opening;
   wherein the sequence of movements includes rotation around three axes.

2. The method as claimed in claim 1, further comprising:
   simulating the removal of the filling material by the processor based on flow properties of the filling material;
   performing additional simulations with different positionings and/or different sequences of movements; and
   using the processor to select a positioning and a sequence of movements with which most filling material is removed from the component in the shortest time.

3. The method as claimed in claim 1, further comprising applying suction to the connection opening to remove filling material from the component.

4. The method as claimed in claim 1, wherein the actuator is located on a robot and the robot performs the selected sequence of movements.

5. The method as claimed in claim 1, further comprising applying vibration to the component with a mechanical vibration generator.

6. The method as claimed in claim 5, wherein the mechanical vibration generator generates vibrations in an ultrasonic range.

7. The method as claimed in claim 1, wherein the flow behavior of the filling material is calculated by the processor further based on particle size of the filling material.

8. A device comprising:
   a processor;
   a memory storing computer program including instructions, the instructions when loaded and executed by the processor, configure the processor to:
   access a computer aided draft (CAD) dataset used to the manufacture a component having an internal cavity;
   analyze geometry data from the CAD dataset including a location and an orientation of a connection from the internal cavity opening to surroundings of the component, the cavity holding a filling material;
   calculate a necessary position of the component based at least on the analyzed geometry data, a flow behavior of the filling material, and gravitational force;
   generate instructions for an actuator to move a mounting through a sequence of movements for moving the component through space to spill the filling material from the cavity through the connection opening out of the component based on calculated necessary position; and
   drive the actuator through the positioning and the sequence of movements of the component;
   wherein the sequence of movements includes rotation around three axes.

9. A production unit comprising:
   a movable mounting for holding and moving a manufactured component;
   an actuator driving the movable mounting;
   a controller for activating the actuator;
   a processor; and
   a memory storing computer program including instructions, the instructions when loaded and executed by the processor, configure the processor to:
   access a computer aided drafting (CAD) dataset used to manufacture the component;
   analyze geometry data from the CAD dataset including a location and an orientation of a connection from a cavity in the component to surroundings of the component, the cavity holding a filling material;
   calculate a necessary position of the component based at least on the analyzed geometry data, a flow behavior of the filling material, and gravitational force;
   determine a sequence of movements for moving the component through space to spill the filling material from the cavity through the connection opening out of the component; and
   generate a set of instructions for the controller to position the manufactured component through the sequence of movements
   wherein the sequence of movements includes rotation around three axes.

10. The production unit as claimed in claim 9, further comprising:
    an installation for additive manufacturing of the component; and
    a material interface for receiving the component by the mounting.

* * * * *